(12) United States Patent
Doerner

(10) Patent No.: US 8,442,945 B1
(45) Date of Patent: May 14, 2013

(54) NO TOUCH SYNTHETIC FULL BACKUP

(76) Inventor: Don Doerner, San Jose, CA (US)

( * ) Notice: Subject to any disclaimer, the term of this patent is extended or adjusted under 35 U.S.C. 154(b) by 0 days.

(21) Appl. No.: 13/342,753

(22) Filed: Jan. 3, 2012

(51) Int. Cl.
*G06F 17/30* (2006.01)

(52) U.S. Cl.
USPC ........... 707/655; 707/609; 707/640; 711/100; 711/154; 711/161; 711/162

(58) Field of Classification Search .................. 707/665, 707/609, 640; 711/100, 154, 161
See application file for complete search history.

(56) References Cited

U.S. PATENT DOCUMENTS

| | | | |
|---|---|---|---|
| 2011/0125714 A1* | 5/2011 | Manson | 707/645 |
| 2011/0161297 A1* | 6/2011 | Parab | 707/646 |
| 2012/0143835 A1* | 6/2012 | Aronovich et al. | 707/696 |
| 2012/0239625 A1* | 9/2012 | Aronovich et al. | 707/647 |

* cited by examiner

*Primary Examiner* — Shyue Jiunn Hwa

(57) ABSTRACT

Example apparatus and methods concern no touch synthetic full backups where a new backup is created using information about previous backups but without reading data from the existing backups. The no touch synthetic backup can be created by correlating file system information, backup specification information, and dedupe system information. One example method includes accessing a set of target extents associated with a synthetic backup image overlay specification and accessing a set of source extents associated with a file stored in a previous backup image. The set of source extents are selected so that they can provide data sufficient to cover the data described in the set of target extents. The method includes creating a set of correlation extents that bridge the gap between the original specification and the final specification.

13 Claims, 10 Drawing Sheets

NO TOUCH SYNTHETIC FULL BACKUP

BACKGROUND

The need to back up data is ubiquitous. As the amount of data to be backed up continues to grow, more and more sophisticated approaches to backup are desired. Grandfather-father-son (GFS) sets of backup images are known to those skilled in the art. In some instances, a GFS set of backup images may have all the data needed to create a synthetic full backup. Thus, a backup application may attempt to specify a new backup image in terms of previous backup images including full backups and incremental backup images. This specification may take the form of instructions like, for example, "take x bytes from backup B1 starting at location L1 and then take y bytes from backup B2 starting at location L2 . . . " The backup application may be unconcerned with where or how the actual underlying data is stored. For example, the data may be stored on tapes, in solid state devices, on disks, or elsewhere. Regardless of how or where it is stored, the new backup image can be specified in terms of the old backup image(s).

A synthetic backup is created by collecting data from a previous backup(s) rather than from an original source. The backup is referred to as a "synthetic" backup because it is not a backup created from original data. A synthetic full backup does not actually transfer data from an original non-backed up source (e.g., client computer) to backup media. Instead, to the extent a synthetic full backup transfers data, it may transfer data from one backup media to another backup media.

BRIEF DESCRIPTION OF THE DRAWINGS

The accompanying drawings, which are incorporated in and constitute a part of the specification, illustrate various example systems, methods, and other example embodiments of various aspects of the invention. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

DETAILED DESCRIPTION

Example apparatus and methods concern no touch synthetic full backups. A backup application may be able to describe the construction of a "synthetic" full backup image in terms of files, offsets, and lengths associated with a previous backup. A de-duplication (dedupe) storage system (e.g., DXi) may be able to describe files in terms of extents in a binary large object (BLOB) or objects. The BLOBs may include sets of unique blocks of data and may be stored in a dedupe block pool. Example systems and methods may translate the synthetic full backup description from its original specification in terms of files, offsets, and lengths in a previous backup(s) and produce a new specification in terms of BLOBs, offsets, and lengths associated with a dedupe system. When this translation is performed, the dedupe storage system may then be able to construct the backup image from data (e.g., BLOBs, blocks) that the dedupe system already has stored without reading or otherwise manipulating the data (e.g., files in file system, actual data on previous backup tape) of which the backup image is composed.

Figure 1:
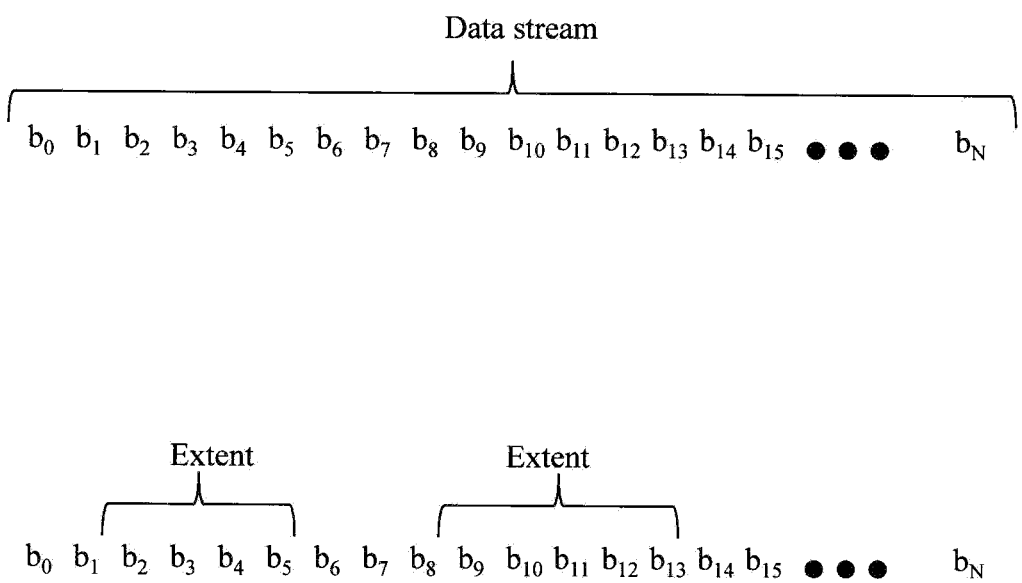
FIG. 1 illustrates a data stream and an extent.

Example apparatus and methods may be described using terminology familiar to one skilled in the art of dedupe. For example, a "data stream" refers to a contiguous sequence of bytes or characters or members of the data stream. A data stream may be of indeterminate but finite length. The first byte in a data stream is referred to as byte $0$ (e.g., $b_0$). An "extent" refers to a contiguous sub-sequence in a data stream. The first byte in an extent ($Eb_0$) may be located anywhere in the data stream so long as the extent is a proper sub-sequence that lies entirely within the data stream. A data stream and an extent are illustrated in FIG. 1.

Figure 2:
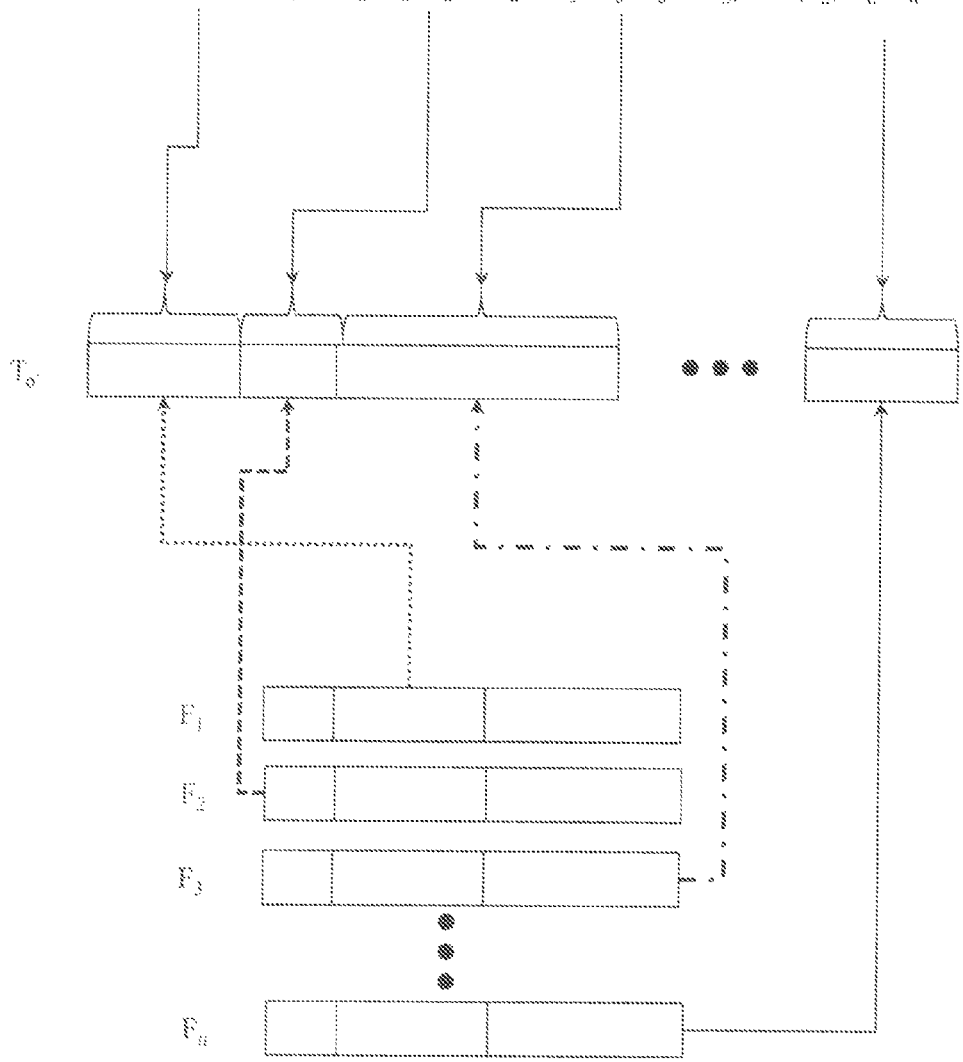
FIG. 2 illustrates describing a backup image from the point of view of a file system.
Figure 3:
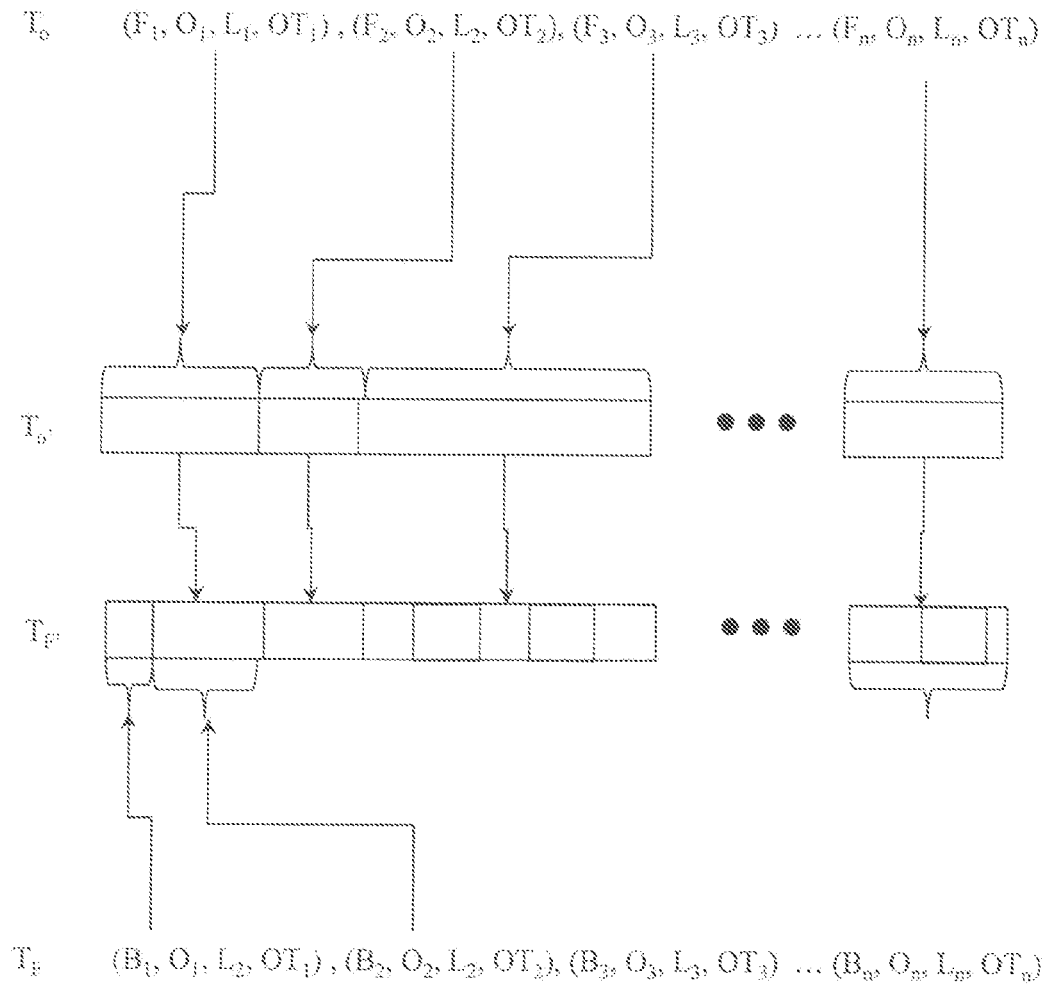
FIG. 3 illustrates describing a backup image from the point of view of a file system and from the point of view of a dedupe system.
Figure 4:
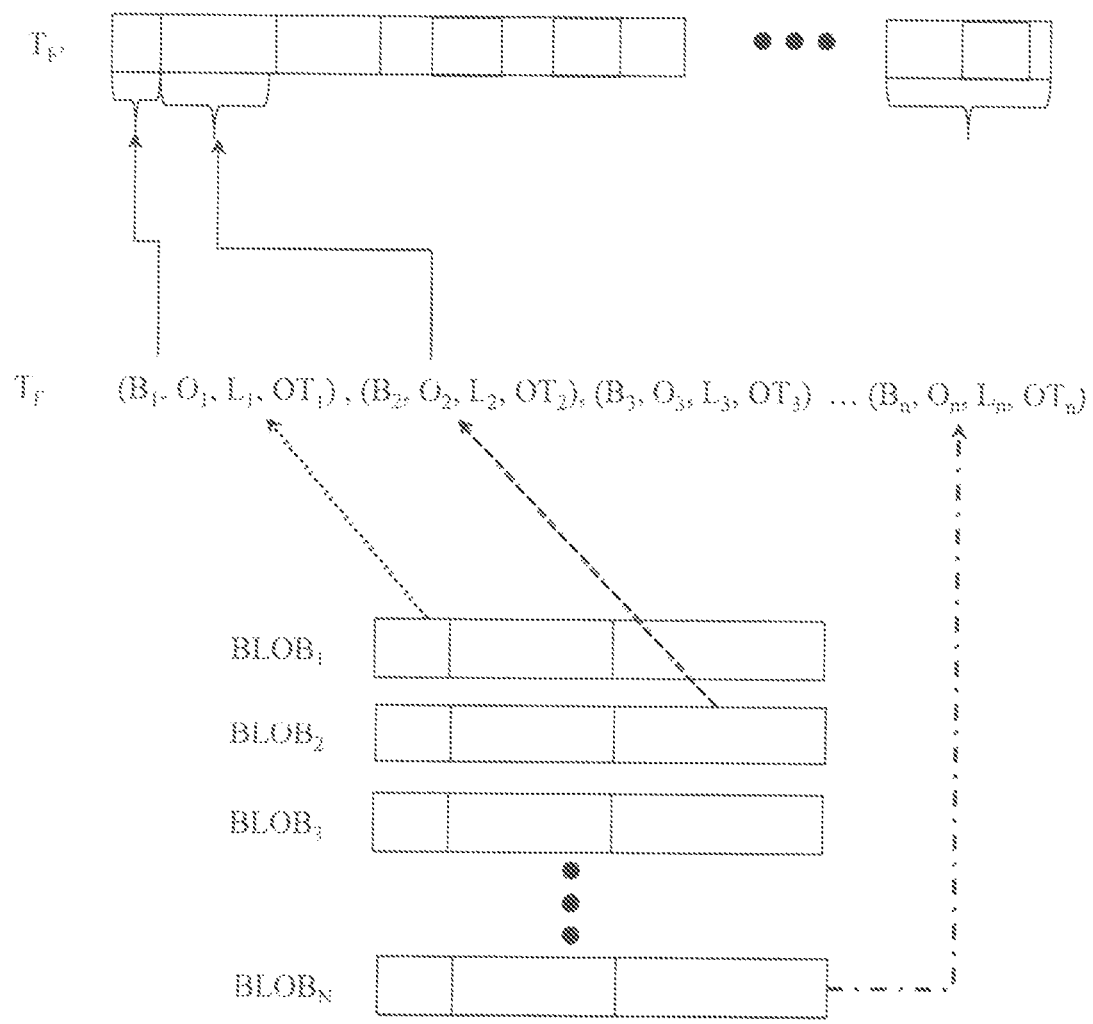
FIG. 4 illustrates describing a backup image from the point of view of a dedupe system.

An "overlay specification" is a specification of the data stream in terms of potentially overlapping extents. If a byte in the data stream is specified more than once, then the last specification of that byte is effective. Thus, an overlay specification is order dependant. An overlay specification may also be referred to as a "tiling". A "normalized overlay specification" is a specification of the data stream in terms of non-overlapping extents. A normalized overlay specification is order independent. A normalized overlay specification may also be referred to as a "minimal order tiling." A normalized overlay specification is illustrated in FIG. 2. Translating from a file system centric overlay specification to a dedupe centric overlay specification is illustrated in FIGS. 3 and 4.

"Blocks" are the atoms of unique data that may be stored by a dedupe system. A block may be relatively small (e.g., 1 Kb) as compared to a binary large object (BLOB). BLOBs may store collections of blocks and thus are generally larger than blocks. BLOBs may be, for example, on the order of 1 Mb.

Figure 5:
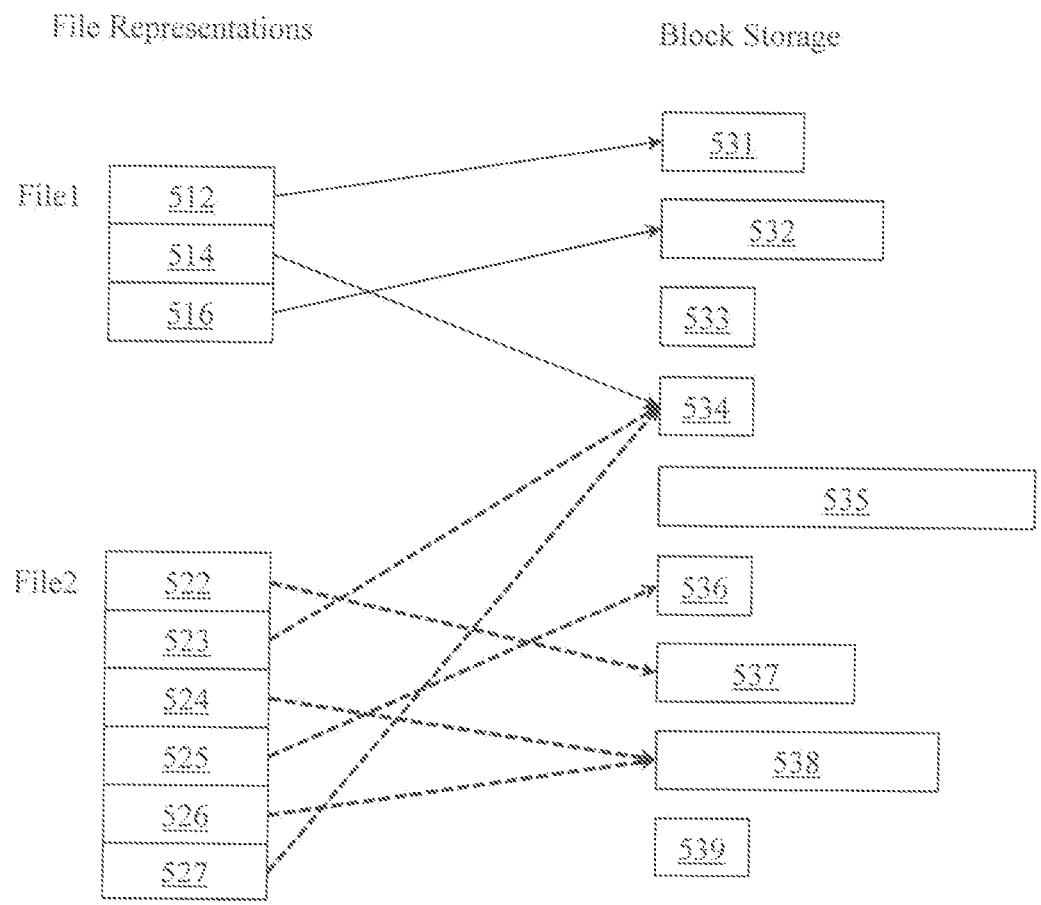
FIG. 5 illustrates file representations in a dedupe system.

A file system may represent a file in storage as a set of bytes having a starting position and length. A file may also be represented as a set of several blocks, where a block has a location and a length. One possible file representation in a dedupe system is illustrated in FIG. 5. A file may be described in terms of its block membership. Blocks may be associated with one or more BLOBs. Blocks may also be associated with one or more files. While FIG. 5 illustrates a file being represented by its block membership, a file could also be represented by BLOB membership and extents within a BLOB. Therefore, one skilled in the art will appreciate that a file may be described in terms of its BLOB membership and the portion(s) of a BLOB(s) needed to create the file. Thus, a backup image, which is the description of what is in a backup, can be described in terms of BLOB partitions through some set algebra manipulations that are possible due to shared abstractions in file representations between a file system and a dedupe block pool. The shared abstractions allow correlations to be made between a backup image specified in terms of a file system or in terms of previous backups associated with a file system and a backup image specified in terms of a dedupe system.

Example apparatus and methods may create a dedupe formula or recipe for the next in a series of backups using information provided about previous members of the series of backups. If the dedupe formula can be created from previously provided data, then it may not be necessary to re-provide the data. This can save bandwidth, transmission time and costs, and memory. If data sufficient to provide the backup is available in a dedupe block pool, then it may not even be necessary to read data from a previous backup image. In this instance, a no-touch synthetic full backup may be created where previously backed up data is not read and where new data is not provided. Through set algebra, a dedupe centric backup specification can be created without moving data.

Conceptually, a backup application can tell a backup creator how to build the next in the series of backups from previous members in a series of backups. For example, the backup application could tell the backup creator to take this many bytes starting at this location from this backup and put it first in the new backup. Then the backup application could tell the backup creator to take some more bytes starting at another location from another backup and put them next in the next backup. More generally, the backup application could take L bytes starting at position P in backup B and put those bytes at output position OP in the new backup NB. The new backup NB would thus be described in terms of what is supposed to be in the new backup with the data coming from previous backups. A conventional system may then read all the data from the specified locations and write all that data to, for example, a new tape. Example apparatus and methods may not be so primitive or literal.

FIG. 2 illustrates an original set of target extents $T_o$. These original target extents are described in terms of files, offsets in the files, lengths in the files, and a desired output location in the synthetic backup that is going to be created. FIG. 2 illustrates the tuples that describe extents and also illustrates blocks of data corresponding to the extents described by the tuples. FIG. 2 also illustrates how the data to fill in a block could be acquired from files $F_1$ through $F_n$. For a synthetic backup, the files $F_1$ through $F_n$ may be previous backups.

Rather than read the data from the locations specified in the previous backups, example apparatus and methods may try to create yet another specification or recipe for the new backup. This new specification or recipe may describe the backup in terms of BLOBs or blocks available in a dedupe block pool. Instead of reading the data from the specified files, example apparatus and methods may look at the file specifications and determine which BLOBs or blocks in a block pool are needed to create the backup. FIGS. 3 and 4 illustrate the translation from a (file, offset, length, output offset) tuple to a (BLOB, offset, length, output offset) tuple. FIG. 3 illustrates how the final target $T_F$ can be expressed in terms of (BLOB, offset, length, output offset) tuples. Then, FIG. 4 illustrates data could be acquired from a block pool that stores BLOBs (e.g., $BLOB_1 \ldots BLOB_n$) instead of acquiring data from files as shown in FIG. 2. One skilled in the art will appreciate that since the blocks in the BLOBs are already available to provide on-demand in response to a request for data, that the data that covers the final target $T_F$ does not actually have to be copied. Thus, unlike a conventional full synthetic backup, where data is copied from one backup media to another backup media, a no touch full synthetic backup can be completed without reading data from a backup media and without writing data to a backup media. The output from a no touch full synthetic backup process is the final target specification, not a new backup image on a tape. Thus, savings in time, inputs and outputs, and in storage media are achieved as compare to conventional systems.

In an extreme case, perhaps only one BLOB would be needed because the backup consists of the same data repeated over and over and over. In this extreme case, the new backup image specification would include information for where the BLOB or block is located in the block pool, and the number of times the block would need to be repeated to make the backup image. If someone or something later asked for this new backup, it could be created by identifying the block needed for the backup and by providing the specification or recipe. If the someone or something requesting the backup image did not have the BLOB or block, then the BLOB or block could be provided from the block pool. Note that at no time during the creation of the new backup was data read from the existing backups. All that happened was that a "no touch full synthetic backup" was created by resolving file system information with specification information and dedupe system information.

Some portions of the detailed descriptions that follow are presented in terms of algorithms and symbolic representations of operations on data bits within a memory. These algorithmic descriptions and representations are used by those skilled in the art to convey the substance of their work to others. An algorithm, here and generally, is conceived to be a sequence of operations that produce a result. The operations may include physical manipulations of physical quantities. Usually, though not necessarily; the physical quantities take the form of electrical or magnetic signals capable of being stored, transferred, combined, compared, and otherwise manipulated in a logic, and so on. The physical manipulations create a concrete, tangible, useful, real-world result.

It has proven convenient at times, principally for reasons of common usage, to refer to these signals as bits, values, elements, symbols, characters, terms, numbers, and so on. It should be borne in mind, however, that these and similar terms are to be associated with the appropriate physical quantities and are merely convenient labels applied to these quantities. Unless specifically stated otherwise, it is appreciated that throughout the description, terms including processing, computing, determining, and so on, refer to actions and processes of a computer system, logic, processor, or similar electronic device that manipulates and transforms data represented as physical (electronic) quantities.

Example methods may be better appreciated with reference to flow diagrams. While for purposes of simplicity of explanation, the illustrated methodologies are shown and described as a series of blocks, it is to be appreciated that the methodologies are not limited by the order of the blocks, as some blocks can occur in different orders and/or concurrently with other blocks from that shown and described. Moreover, less than all the illustrated blocks may be required to implement an example methodology. Blocks may be combined or separated into multiple components. Furthermore, additional and/or alternative methodologies can employ additional, not illustrated blocks.

Figure 6:
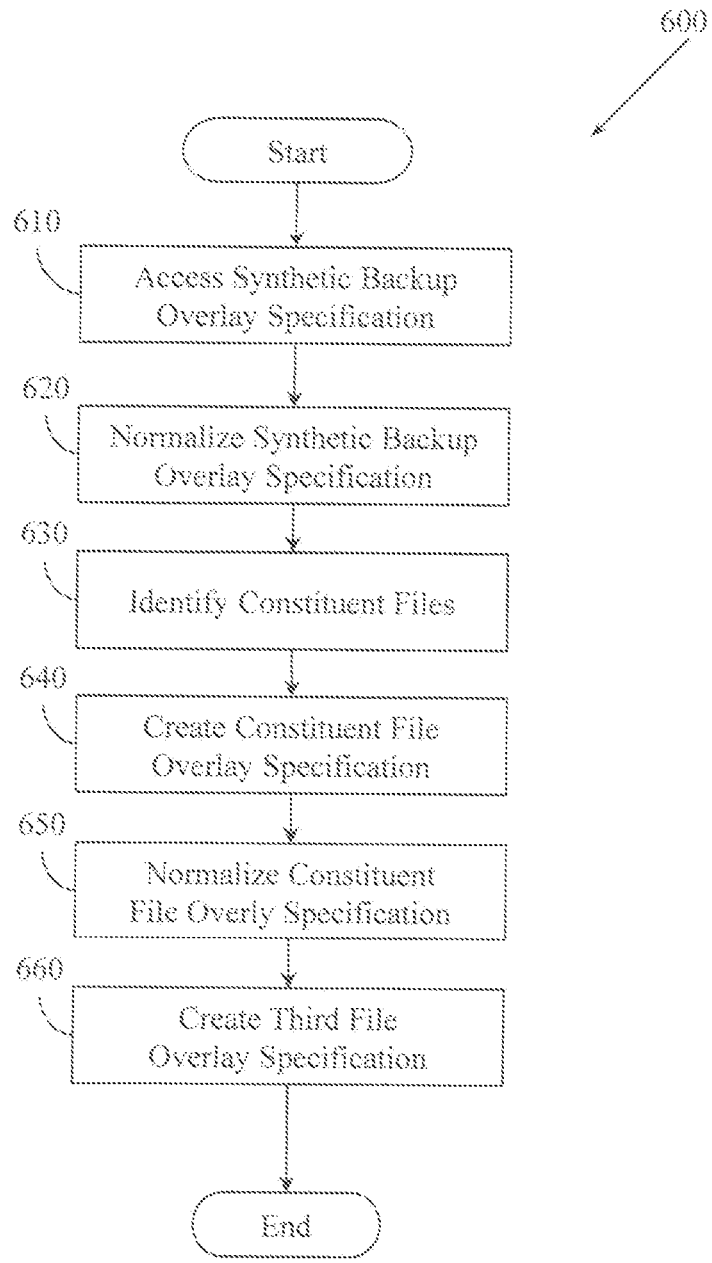
FIG. 6 illustrates a method associated with no touch synthetic full backups.

FIG. 6 illustrates a method 600 for creating a no touch synthetic full backup. Method 600 includes, at 610, accessing a synthetic backup overlay specification that describes a backup data stream in terms of a first set of extents. This first set of extents may overlap. In one example, the synthetic backup overlay specification comprises a set of descriptors of the form $(F_i, O_i, L_i, OT_i)$, where $F_i$ represents an ith file in the set, $O_i$ represents an offset in the ith file, $L_i$ represents a length in the ith file, and $OT_i$ represents the ith offset in a target image. One skilled in the art will appreciate that other arrangements and orders for $F_j$, $O_j$, $OT_i$ are possible. The target image is the backup that the backup application wants to be created. The synthetic backup overlay specification may be provided in terms of files, offsets, and lengths.

In one example, the synthetic backup overlay may be provided by a backup application associated with a file system. The backup application may have previously provided a backup overlay specification(s) for which a backup image(s) may have been created. Thus, the backup data stream may be able to be described in terms of a previous backup data stream(s). Additionally, the data for the backup data stream may be available in a previous backup data stream(s). The previous backup data stream(s) may be stored on tape. If the previous backup data stream has been de-duplicated, or if the data from which the backup was produced has been de-duplicated, then a no touch full synthetic backup may be able to be created.

Method 600 also includes, at 620, normalizing the synthetic backup overlay specification into a first normalized overlay specification. This first normalized overlay specification describes the backup stream in terms of a second set of extents that do not overlap. In one example, the first normalized overlay specification comprises a set of descriptors of the form $(F_j, O_j, L_j, OT_j)$, where $F_j$ represents a jth file in the set, $O_j$ represents an offset in the jth file, $L_j$ represents a length in the jth file, and $OT_j$ represents the ith offset in the target image. Thus, in one example, the first normalized overlay specification may be provided in terms of files, offsets, and lengths. Different orders and arrangements for the descriptors are possible.

Method 600 also includes, at 630, identifying a set of constituent files from which the second set of extents can be satisfied. The set of constituent files may be available from a file system or may be available from a previous backup(s) that has been created. In one example, the representation of a constituent file may be given in terms of BLOBs from which the file can be recreated.

Method 600 also includes, at 640, creating a constituent file overlay specification from the set of constituent files. The constituent file overlay specification describes a third set of extents in terms of BLOBs from which the second set of extents can be satisfied. In one embodiment, the constituent file overlay specification comprises a set of descriptors of the form $(B_k, O_k, L_k)$, where $B_k$ represents a kth BLOB in the set, $O_k$ represents an offset in the kth BLOB, and $L_k$ represents a length in the kth BLOB. Thus, in one embodiment, the constituent file overlay specification may be provided in terms of BLOBs, offsets, and lengths.

Method 600 also includes, at 650, normalizing the constituent file overlay specification into a second normalized overlay specification where extents do not overlap. In one example, the second normalized overlay specification comprises a set of descriptors of the form $(B_m, O_m, L_m)$, where $B_m$ represents an mth BLOB in the set, $O_m$ represents an offset in the mth BLOB, and $L_m$ represents a length in the mth BLOB. Thus, in one embodiment, the second normalized overlay specification may be described in terms of BLOBs, offsets, and lengths. Different orders and arrangements for the descriptors are possible.

Method 600 also includes, at 660, creating a third overlay specification from the first normalized overlay specification and the second normalized overlay specification. In one example, the third overlay specification has the form of a set of $(B_s, P_s, L, P_t)$, where $B_s$ refers to a BLOB, $P_s$ refers to a source offset in the BLOB referred to by $B_s$, L refers to a length of an extent starting at $P_s$ in $B_s$, and $P_t$ refers to a target offset in a target backup image. The third overlay specification is created by resolving the second set of extents using the third set of extents. In one example, resolving the second set of extents using the third set of extents includes identifying a member(s) of the third set of extents from which data in a member of the second set of extents can be acquired. The data in the third set of extents is said to cover the data required to satisfy the second set of extents when all the data for the second set of extents can be found in the third set of extents. Data associated with the third set of extents may be found, for example, in a dedupe system block pool.

When the third set of extents provides data sufficient to cover the second set of extents, then the target backup image can be a no touch dedupe centric backup image. Making this no touch dedupe centric backup image can be achieved without reading data from the one or more previous backup data streams. With the no touch dedupe centric backup image available, example apparatus and methods can retrieve data to be provided to satisfy a request from a file system for backed up data without touching a backup image on a backup media. In one example, the retrieved data can be provided from a block pool associated with a dedupe system that stores unique data for the file system instead of being read from, for example, a backup image on tape.

While FIG. 6 illustrates various actions occurring in serial, it is to be appreciated that various actions illustrated in FIG. 6 could occur substantially in parallel. By way of illustration, a first process could access and normalize synthetic backup overlay specifications, a second process could create and normalize the constituent file overlay specification, and a third process could create the third overlay specification. While three processes are described, it is to be appreciated that a greater and/or lesser number of processes could be employed and that lightweight processes, regular processes, threads, and other approaches could be employed.

In one example, a method may be implemented as computer executable instructions. Thus, in one example, a computer-readable medium may store computer executable instructions that if executed by a machine (e.g., processor) cause the machine to perform methods described herein including methods 600, and 800. While executable instructions associated with the listed methods are described as being stored on a computer-readable medium, it is to be appreciated that executable instructions associated with other example methods described herein may also be stored on a computer-readable medium.

Figure 7:
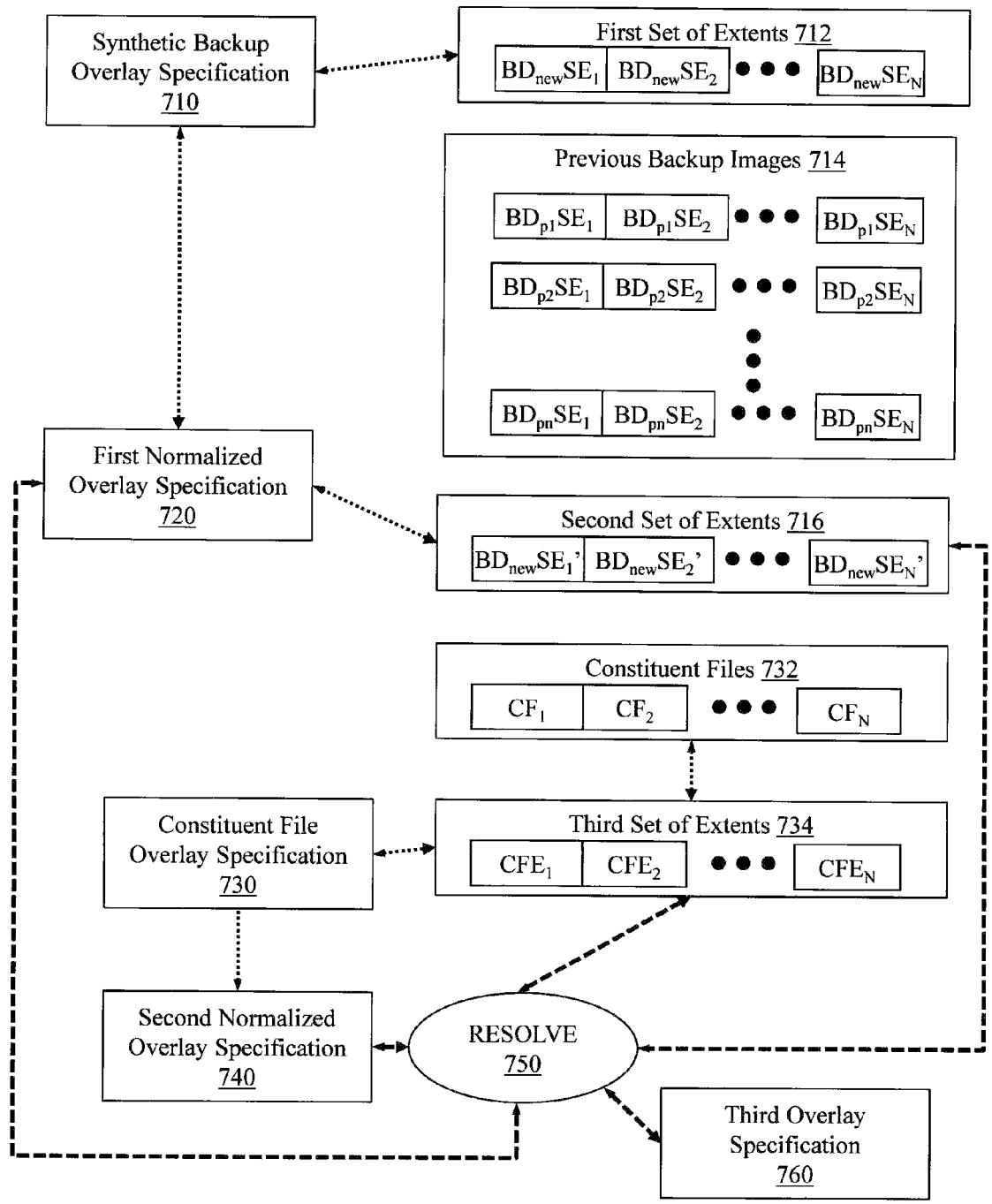
FIG. 7 illustrates a data flow associated with a method associated with no touch synthetic full backups.

FIG. 7 illustrates a data flow associated with method 600. A synthetic backup overlay specification 710 can be described in terms of a first set of extents 712 (e.g., Backup Data Stream New Synthetic 1 ($BD_{new}SE_1$)) to be pieced together to form the new backup. This can be seen as being a description of what is to go in the new backup and where certain things are to be placed in that new backup. The first set of extents 712 may have overlapping extents and thus can be normalized into a second set of extents 716 that are associated with a first normalized overlay specification 720. Recall that the first set of extents 712 may be able to be covered by extents found in previous backup images 714 (e.g., Backup Data Stream Previous 1 Synthetic 1 ($BD_{P1}SE_1$)).

Information about the files needed to produce the previous backup images 714 may be available. Therefore, a set of constituent files 732 can be identified and a third set of extents 734 can be created. This third set of extents 734 can be organized into a constituent file overlay specification 730 that can be normalized into a second normalized overlay specification 740. While the first set of extents 712 and the second set of extents 716 may be described in terms of files, offsets, and lengths, the third set of extents 734 may be described in terms of BLOBs, offsets, and lengths.

A resolve process or apparatus 750 may access the various normalized overlay specifications and sets of extents to produce the third overlay specification 760.

Figure 8:
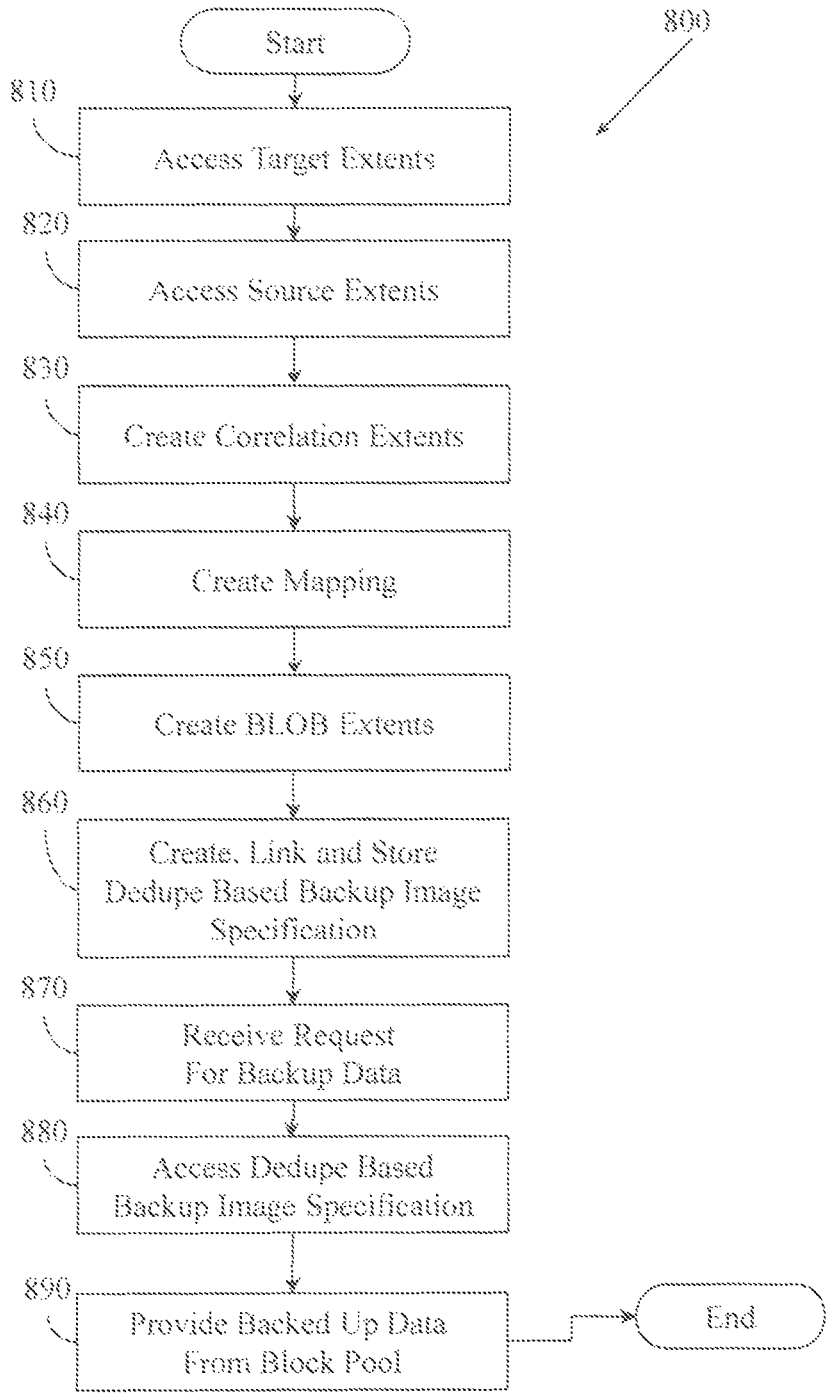
FIG. 8 illustrates a method associated with no touch synthetic full backups.

FIG. 8 illustrates a method 800 for creating a no touch synthetic full backup. Method 800 includes, at 810, accessing a set of target extents associated with a synthetic backup image overlay specification. A target extent may be expressed in terms of an offset and a length in a synthetic backup image. Accessing the set of target extents may include, for example, receiving the set as an input to a process, opening a file where the extents are described, receiving a stream of extent descriptors, and other actions.

Method 800 also includes, at 820, accessing a set of source extents. A source extent may be expressed in terms of a file identifier, an offset in a file associated with the file identifier, and a length. The file identifier may be associated with a file stored in a previous backup image. Method 800 assumes that the set of source extents can provide data sufficient to cover the data described in the set of target extents. Accessing the set of source extents may include, for example, receiving the set as an input to a process, opening a file where the extents are described, receiving a stream of extent descriptors, and other actions.

Method 800 also includes, at 830, creating a set of correlation extents. A correlation extent may be described in terms of a file identification, an offset in the target, an offset in the source, and a length. The file identification may be associated with a file stored in a previous backup image. Method 800 assumes that the set of correlation extents can provide data sufficient to cover the data described in the set of target extents.

Method 800 also includes, at 840, creating a mapping from a correlation extent to one or more BLOB extents. A BLOB extent may include a block(s) that is stored in a block pool by a de-duplication system that stores unique blocks of data associated with an entity that provided the synthetic backup image. Creating the mapping may include, for example, populating an existing data structure, creating a new data structure, writing a file, writing to an output stream, and other actions.

Method 800 also includes, at 850, creating a set of BLOB extents from the mapping. Method 800 assumes that the set of BLOB extents can provide data sufficient to cover the data described in the set of target extents. Creating a set of BLOB extents may include, for example, populating an existing data structure, creating a new data structure, writing a file, writing to an output stream, and other actions.

Method 800 also includes, at 860, creating a dedupe based backup image specification from the mapping. Creating the dedupe based backup image specification may include, for example, writing a file, populating an existing data structure, manipulating an existing data structure, creating a new data structure, writing to an output stream, and other actions. With the dedupe based backup image specification available, method 800 may create an association between the dedupe based backup image specification and the synthetic backup image overlay specification and then store the dedupe based backup image specification. Storing the dedupe based backup image specification may include, for example, writing to a file, writing to a disk, writing to a memory, updating an existing entity, creating a new entity, and other actions.

In one embodiment, method 800 may also include, at 870, receiving a request for backed up data. The request may be received from, for example, a recovery application. The request may identify that the data is to be retrieved, for example, from the synthetic backup image. In response to the request received at 870, method 800 may proceed, at 880, to access the dedupe based backup image specification that was linked to or otherwise associated with the synthetic backup image and, at 890, to provide the backed up data from the block pool using the dedupe based backup image specification.

Figure 9:
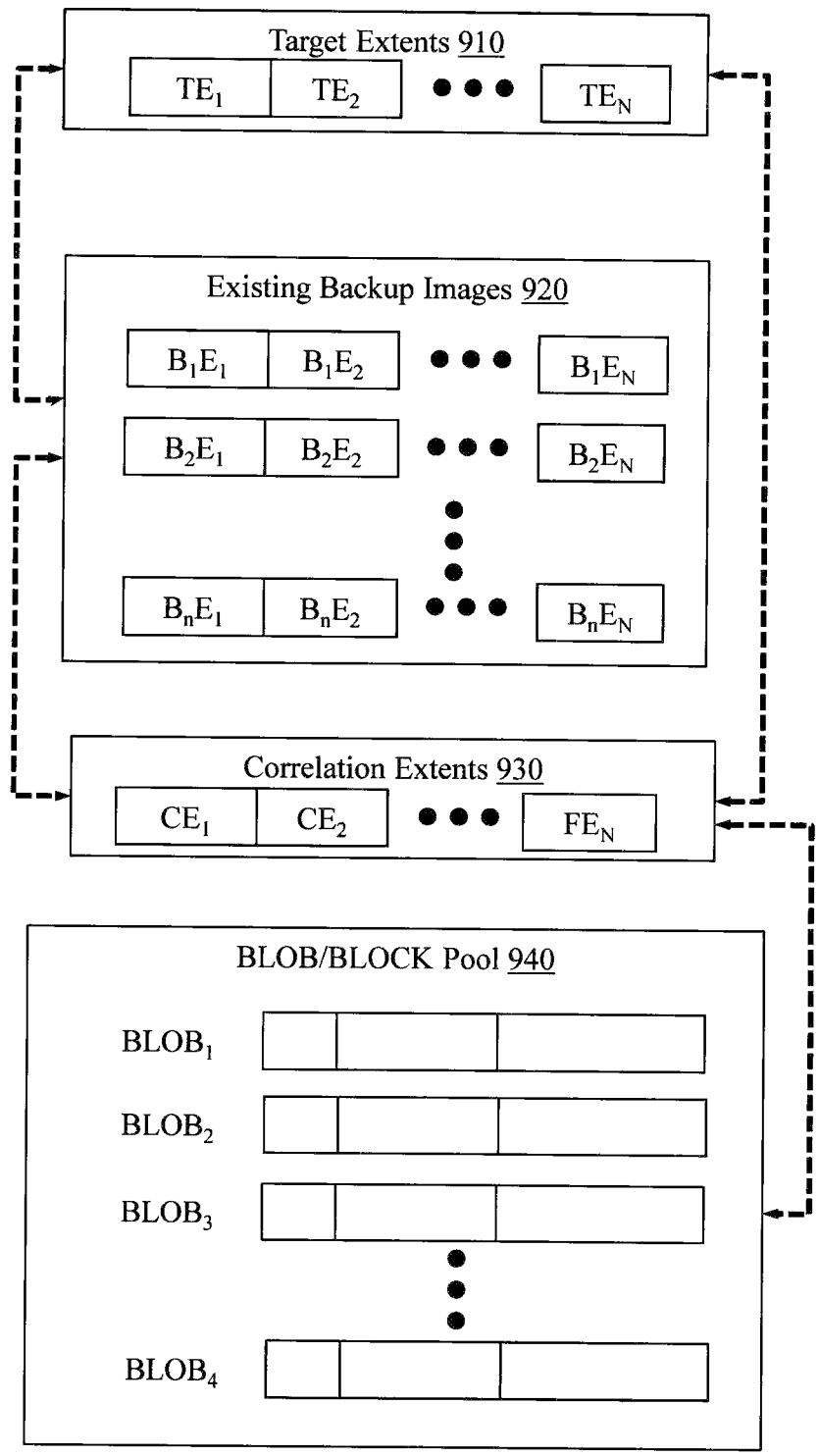
FIG. 9 illustrates a data flow associated with a method associated with no touch synthetic full backups.

FIG. 9 illustrates a data flow associated with method 800. A set of target extents 910 describes what the new backup is supposed to look like. The set of target extents 910 specifies what data is to be in the new backup and where that data is supposed to go. The data is supposed to be available in existing backup images 920. For example, data needed to satisfy target extent 1 ($TE_1$) may be found in backup1 extent2 ($B_1E_2$) and in backup n extent 1 ($B_nE_1$). The correlation extents 930 relate files and extents in the existing backup images 920 to the desired new backup image described by target extents 910. The correlation extents 930 may not actually acquire data from the extents in the existing backup images 920 but may instead identify extents that are available in BLOBs in BLOB pool 940. In one embodiment, when the granularity is at the block level instead of at the BLOB level, then the correlation extents may identify blocks that are available in the block pool 940.

Figure 10:
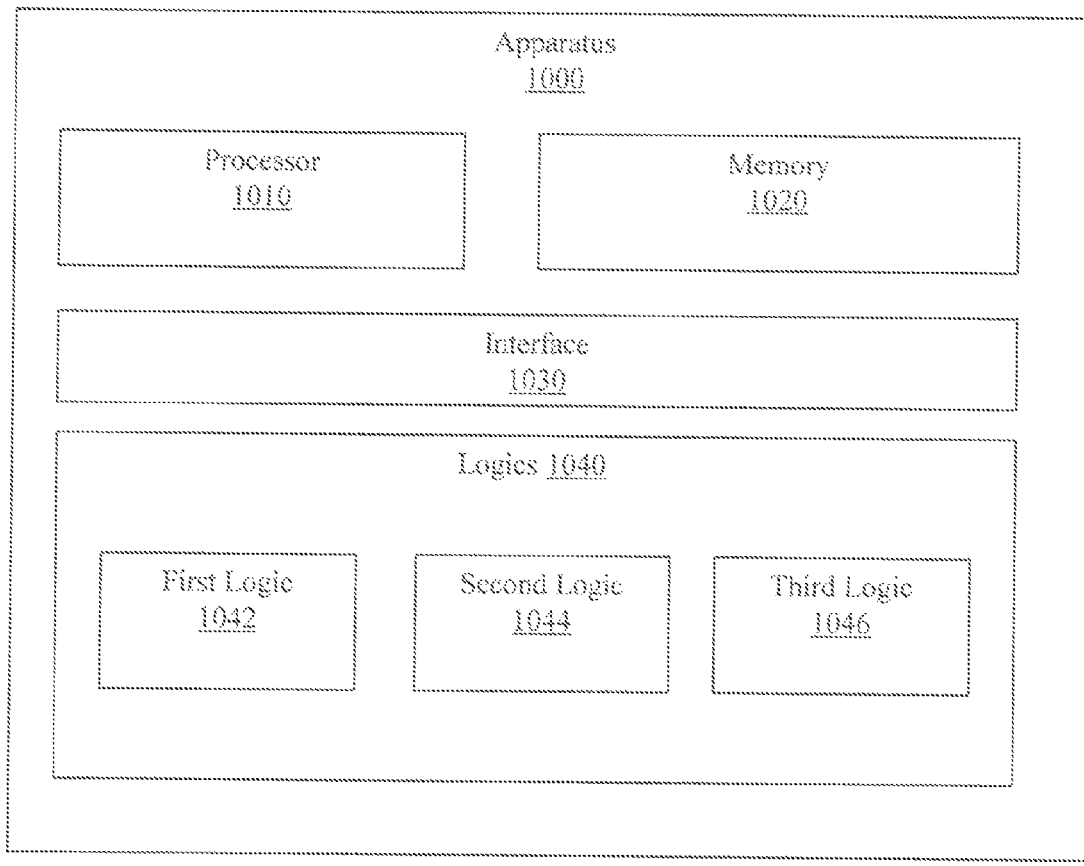
FIG. 10 illustrates an apparatus associated with no touch synthetic full backups.

FIG. 10 illustrates an apparatus 1000 for creating a no touch full synthetic backup. Apparatus 1000 includes a processor 1010, a memory 1020, a set 1040 of logics, and an interface 1030 to connect the processor 1010, the memory 1020, and the set 1040 of logics. In one embodiment, apparatus 1000 may be a special purpose computer that is created as a result of programming a general purpose computer. In another embodiment, apparatus 1000 may include special purpose circuits that are added to a general purpose computer to produce a special purpose computer.

In one embodiment, the set 1040 of logics includes a first logic 1042, a second logic 1044, and a third logic 1046. In one embodiment, the first logic 1042 is configured to normalize a synthetic backup overlay specification into a first normalized overlay specification that describes a backup stream in terms of a second set of extents that do not overlap. The synthetic backup overlay specification describes a backup data stream in terms of a first set of extents that may overlap. The first set of extents describe what is supposed to be in the new backup and where it is supposed to be located. The backup data stream can be described in terms of one or more previous backup data streams. Thus, the data for the backup data stream is available in the one or more previous backup data streams. When the one or more previous backup data streams have been deduplicated, or when the data from which the previous backup data streams were created has been de-duplicated, then apparatus 1000 may create a no touch full synthetic backup. In one embodiment, the first normalized overlay specification comprises a set of descriptors of the form ($F_j$, $O_j$, $L_j$, $OT_j$), where $F_j$ represents a jth file in the set, $O_j$ represents an offset in the jth file, $L_j$ represents a length in the jth file, and $OT_j$ represents the jth offset in the target image.

In one embodiment, the second logic 1044 is configured to identify a set of constituent files from which the second set of extents can be satisfied. After identifying the set of constituent files, the second logic 1044 may create a constituent file overlay specification from the set of constituent files. In one embodiment, the constituent file overlay specification comprises a set of descriptors of the form ($B_k$, $O_k$, $L_k$), where $B_k$ represents a kth BLOB in the set, $O_k$ represents an offset in the kth BLOB, and $L_k$ represents a length in the kth BLOB. The constituent file overlay specification describes a third set of extents in terms of binary large objects from which the second set of extents can be satisfied. The second logic 1044 may also be configured to normalize the constituent file overlay specification into a second normalized overlay specification. In one embodiment, the second normalized overlay specification comprises a set of descriptors of the form $(B_m, O_m, L_m)$, where $B_m$ represents an mth BLOB in the set, $O_m$ represents an offset in the mth BLOB, and $L_m$ represents a length in the mth BLOB.

In one embodiment, the third logic 1046 is configured to create a third overlay specification from the first normalized overlay specification and the second normalized overlay specification. The third logic 1046 creates the third overlay specification by resolving the second set of extents using the third set of extents. In one example, the third logic 1046 is configured to resolve the second set of extents using the third set of extents by identifying one or more members of the third set of extents from which data in the members of the second set of extents can be acquired. Recall that the $2^{nd}$ overlay specification may be described in terms of files, offsets, and lengths while the $3^{rd}$ overlay specification may be described in terms of BLOBs, offsets, and lengths. In one embodiment, the third overlay specification has the form of a set of $(B_s, P_s, L, P_t)$, where $B_s$ refers to a BLOB, $P_s$ refers to a source offset in the BLOB referred to by $B_s$, L refers to a length of an extent starting at $P_s$ in $B_s$, and $P_t$ refers to a target offset in a target backup image. One skilled in the art will appreciate that that different arrangements and orders for $B_s$, $P_s$, L, and $P_t$ are possible.

In one embodiment, apparatus 1000 may include a fourth logic 1048. The fourth logic 1048 may be configured to receive a request for backed up data. The request may be presented from the point of view of the synthetic backup image since that is the point of view from which a backup application may have described the backup image. Thus, the fourth logic 1048 may be configured to access the dedupe based backup image specification that was created from the synthetic backup image specification and to provide the backed up data from the block pool using the dedupe based backup image specification.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Computer-readable medium", as used herein, refers to a medium that stores instructions and/or data. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an ASIC, a CD, other optical medium, a RAM, a ROM, a memory chip or card, a memory stick, and other media from which a computer, a processor or other electronic device can read.

"Data store", as used herein, refers to a physical and/or logical entity that can store data. A data store may be, for example, a database, a table, a file, a list, a queue, a heap, a memory, a register, and so on. In different examples, a data store may reside in one logical and/or physical entity and/or may be distributed between two or more logical and/or physical entities.

"Logic", as used herein, includes but is not limited to hardware, firmware, software in execution on a machine, and/or combinations of each to perform a function(s) or an action(s), and/or to cause a function or action from another logic, method, and/or system. Logic may include a software controlled microprocessor, a discrete logic (e.g., ASIC), an analog circuit, a digital circuit, a programmed logic device, a memory device containing instructions, and so on. Logic may include one or more gates, combinations of gates, or other circuit components. Where multiple logical logics are described, it may be possible to incorporate the multiple logical logics into one physical logic. Similarly, where a single logical logic is described, it may be possible to distribute that single logical logic between multiple physical logics.

While example apparatus, methods, and computer-readable media have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Therefore, the invention is not limited to the specific details, the representative apparatus, and illustrative examples shown and described. Thus, this application is intended to embrace alterations, modifications, and variations that fall within the scope of the appended claims.

To the extent that the term "includes" or "including" is employed in the detailed description or the claims, it is intended to be inclusive in a manner similar to the term "comprising" as that term is interpreted when employed as a transitional word in a claim.

To the extent that the term "or" is employed in the detailed description or claims (e.g., A or B) it is intended to mean "A or B or both". When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

To the extent that the phrase "one or more of, A, B, and C" is employed herein, (e.g., a data store configured to store one or more of, A, B, and C) it is intended to convey the set of possibilities A, B, C, AB, AC, BC, and/or ABC (e.g., the data store may store only A, only B, only C, A&B, A&C, B&C, and/or A&B&C). It is not intended to require one of A, one of B, and one of C. When the applicants intend to indicate "at least one of A, at least one of B, and at least one of C", then the phrasing "at least one of A, at least one of B, and at least one of C" will be employed.

What is claimed is:

1. A method, comprising:
    accessing a synthetic backup overlay specification that describes a backup data stream in terms of a first set of extents that may overlap, where the backup data stream can be described in terms of one or more previous backup data streams and where the data for the backup data stream is available in the one or more previous backup data streams;

normalizing the synthetic backup overlay specification into a first normalized overlay specification that describes the backup stream in terms of a second set of extents that do not overlap;

identifying a set of constituent files from which the second set of extents can be satisfied;

creating a constituent file overlay specification from the set of constituent files, where the constituent file overlay specification describes a third set of extents in terms of binary large objects from which the second set of extents can be satisfied;

normalizing the constituent file overlay specification into a second normalized overlay specification, and creating a third overlay specification from the first normalized overlay specification and the second normalized overlay specification by resolving the second set of extents using the third set of extents, where the third overlay specification has the form of a set of ($B_s$, $P_s$, L, $P_t$), where $B_s$ refers to a binary large object (BLOB),
$P_s$ refers to a source offset in the BLOB referred to by $B_s$,
L refers to a length of an extent starting at $P_s$ in $B_s$, and
$P_t$ refers to a target offset in a target backup image,
where s and t are integers.

2. The method of claim 1, where the synthetic backup overlay specification comprises a set of descriptors of the form ($F_i$, $O_i$, $L_i$, $OT_i$),
where:
$F_i$ represents an ith file in the set,
$O_i$ represents an offset in the ith file,
$L_i$ represents a length in the ith file, and
$OT_i$ represents an offset in a target image,
where i is an integer.

3. The method of claim 2, where the first normalized overlay specification comprises a set of descriptors of the form ($F_j$, $O_j$, $L_j$, $OT_j$),
where:
$F_j$ represents a jth file in the set,
$O_j$ represents an offset in the jth file,
$L_j$ represents a length in the jth file, and
$OT_j$ represents an offset in the target image,
where j is an integer.

4. The method of claim 3, where the constituent file overlay specification comprises a set of descriptors of the form ($B_k$, $O_k$, $L_k$),
where:
$B_k$ represents a kth BLOB in the set,
$O_k$ represents an offset in the kth BLOB, and
$L_k$ represents a length in the kth BLOB,
where k is an integer.

5. The method of claim 4, where the second normalized overlay specification comprises a set of descriptors of the form ($B_m$, $O_m$, $L_m$),
where:
$B_m$ represents an mth BLOB in the set,
$O_m$ represents an offset in the mth BLOB, and
$L_m$ represents a length in the mth BLOB,
where m is an integer.

6. The method of claim 1, where resolving the second set of extents using the third set of extents comprises identifying one or more members of the third set of extents from which data in the members of the second set of extents can be acquired.

7. The method of claim 1, where the synthetic backup overlay specification is provided by a backup application associated with a file system, and where the backup application has previously provided one or more backup overlay specifications for which one or more backup images have been created.

8. The method of claim 1, where the target backup image is a no touch dedupe centric backup image from which retrieved data can be provided to satisfy a request from a file system for backed up data, where the retrieved data can be provided from a block pool associated with a dedupe system that stores unique data for the file system.

9. The method of claim 1, comprising creating the target backup image without reading data from the one or more previous backup data streams.

10. An apparatus, comprising:
a processor;
a memory;
a set of logics; and
an interface to connect the processor, the memory, and the set of logics, the set of logics comprising:
a first logic configured to normalize a synthetic backup overlay specification into a first normalized overlay specification that describes a backup stream in terms of a second set of extents that do not overlap, where the synthetic backup overlay specification describes a backup data stream in terms of a first set of extents that may overlap, where the backup data stream can be described in terms of one or more previous backup data streams and where the data for the backup data stream is available in the one or more previous backup data streams;
a second logic configured to identify a set of constituent files from which the second set of extents can be satisfied, to create a constituent file overlay specification from the set of constituent files, where the constituent file overlay specification describes a third set of extents in terms of binary large objects from which the second set of extents can be satisfied, and to normalize the constituent file overlay specification into a second normalized overlay specification; and
a third logic configured to create a third overlay specification from the first normalized overlay specification and the second normalized overlay specification by resolving the second set of extents using the third set of extents, where the third overlay specification has the form of a set of $B_s$, $P_s$, L, $P_1$), where
$B_s$ refers to a binary large object (BLOB),
$P_s$ refers to a source offset in the BLOB referred to $B_s$,
L refers to a length of an extent starting at $P_s$ in $B_s$ and
$P_t$ refers to a tar et offset in a tar et backup image,
where s and t are integers.

11. The apparatus of claim 10:
where the first normalized overlay specification comprises a set of descriptors of the form ($F_j$, $O_j$, $L_j$, $OT_j$), where:
$F_j$ represents a jth file in the set,
$O_j$ represents an offset in the jth file,
$L_j$ represents a length in the jth file, and
$OT_j$ represents an offset in the target image,
where the constituent file overlay specification comprises a set of descriptors of the form ($B_k$, $O_k$, $L_k$), where:
$B_k$ represents a kth BLOB in the set,
$O_k$ represents an offset in the kth BLOB, and
$L_k$ represents a length in the kth BLOB, and
where the second normalized overlay specification comprises a set of descriptors of the form ($B_m$, $O_m$, $L_m$), where:
$B_m$ represents an mth BLOB in the set,
$O_m$ represents an offset in the mth BLOB, and
$L_m$ represents a length in the mth BLOB,
where j, k, and m are integers.

12. The apparatus of claim 11, where the third logic is configured to resolve the second set of extents using the third set of extents by identifying one or more members of the third set of extents from which data in the members of the second set of extents can be acquired.

13. The apparatus of claim 12, comprising a fourth logic configured to receive a request for backed up data, the request being provided in terms of the synthetic backup image, to access the dedupe based backup image specification, and to provide the backed up data from the block pool using the dedupe based backup image specification.

* * * * *

UNITED STATES PATENT AND TRADEMARK OFFICE
CERTIFICATE OF CORRECTION

PATENT NO. : 8,442,945 B1  
APPLICATION NO. : 13/342753  
DATED : May 14, 2013  
INVENTOR(S) : Don Doerner Page 1 of 1

It is certified that error appears in the above-identified patent and that said Letters Patent is hereby corrected as shown below:

Claims

In column 12, line 47 delete "tar et offset in a tar et" and insert --target offset in a target--.

Signed and Sealed this  
Twentieth Day of August, 2013

Teresa Stanek Rea  
*Acting Director of the United States Patent and Trademark Office*